Jan. 8, 1924.
F. HOVING
SWITCHING VALVE
Filed May 22, 1922
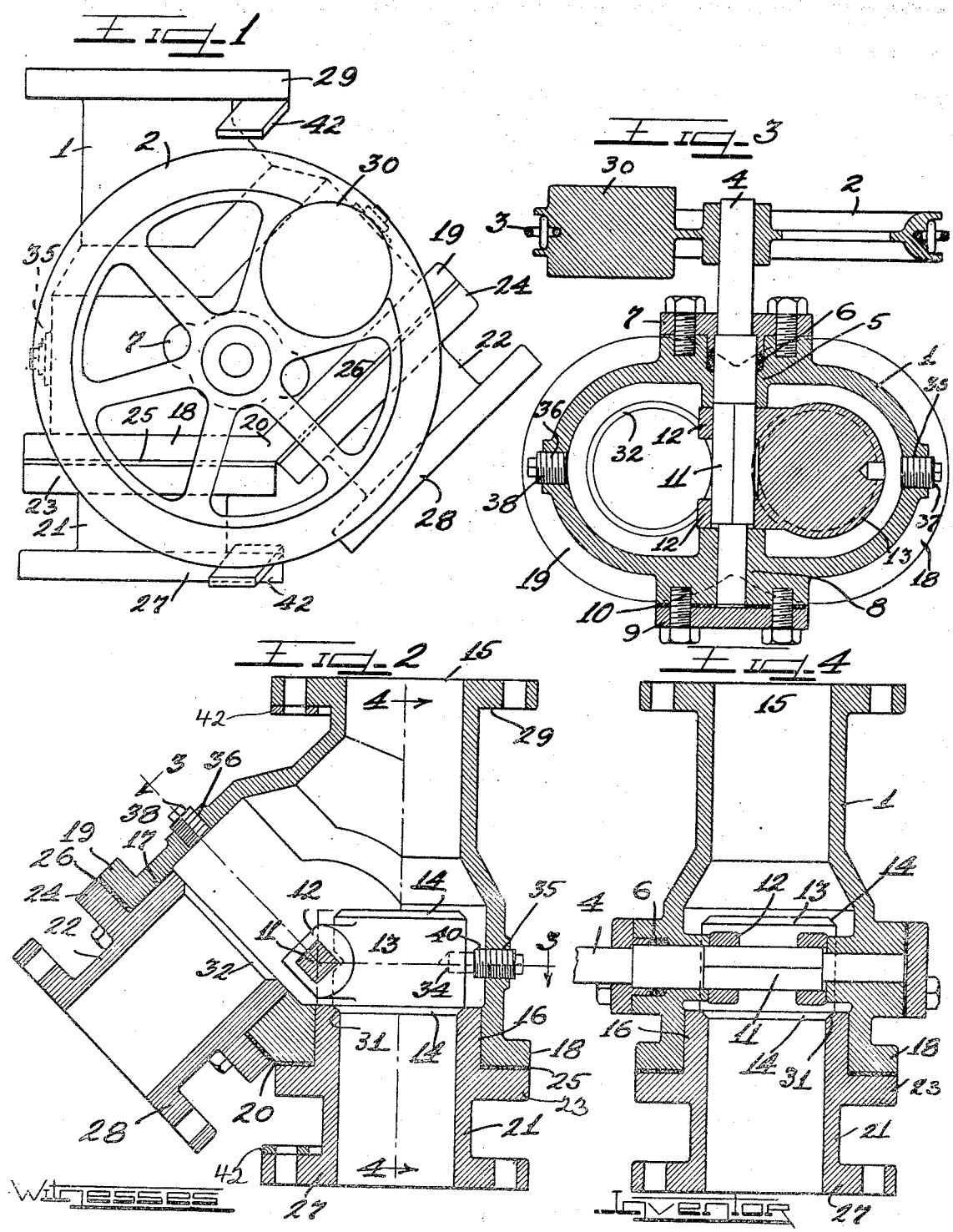

Patented Jan. 8, 1924.

1,480,070

UNITED STATES PATENT OFFICE.

FRITZ HOVING, OF CHICAGO, ILLINOIS, ASSIGNOR, BY MESNE ASSIGNMENTS, TO RAYMOND BROS. ENGINEERING COMPANY, OF CHICAGO, ILLINOIS, A CORPORATION OF ILLINOIS.

SWITCHING VALVE.

Application filed May 22, 1922. Serial No. 562,852.

*To all whom it may concern:*

Be it known that I, FRITZ HOVING, a citizen of the United States, and a resident of the city of Chicago, in the county of Cook and State of Illinois, have invented certain new and useful Improvements in a Switching Valve; and I do hereby declare that the following is a full, clear, and exact description of the same, reference being had to the accompanying drawings, and to the numerals of reference marked thereon, which form a part of this specification.

It is an object of this invention to provide an arrangement whereby a valve controlling two branch pipes may have its seats readily and accurately ground.

It is a further object of this invention to provide a junction between two branch pipes, a valve pivoted between them so as to control either pipe, and means for accurately fitting the valve to valve seats formed in the ends of the branch pipes.

It is a further object of this invention to provide means in the arrangement above described for holding the valves still while the pipes are being rotated to grind the valve seats.

It is a further object of this invention to provide means for closing the openings through which said holding means is introduced.

It is a further object of this invention to provide such a valve with an arrangement by which it may be operated from a distance.

It is a further object of this invention to counterbalance the valve so that the operation thereof shall be easy.

It is a further object of this invention to provide removable short pieces of pipe or junction pieces between the longer branch pipes and the fitting containing the valve so that the rotation necessary to grind the valve and valve seats shall not require the rotation of any long pipes.

Other and further important objects of this invention will be apparent from the disclosures in the specification and drawings.

The invention (in a preferred form) is illustrated in the drawings and hereinafter more fully described.

On the drawings:

Figure 1 is a side elevation of the fitting and valve.

Figure 2 is a central vertical section.

Figure 3 is a section upon the line 3—3 of Figure 2.

Figure 4 is a section upon the line 4—4 of Figure 2.

As shown on the drawings:

The valve is mounted in a fitting 1 of the conventional Y shape. The valve is operated by a pulley 2 which may be operated from a distance by means of a chain 3. The pulley acts to rotate a shaft 4 which goes through a bearing 5 provided with a packing gland 6, a pressure member on this gland being made integral with the cover 7 for the bearing. The other end of the shaft is mounted in a bearing 8 which is closed by a cover 9 protected by a gasket 10. The central part of the shaft, as shown at 11, is made square in order to rotate the valve. Preferably the valve is formed with a pair of ears 12 with square openings therein to fit the squared part 11 of the shaft.

The valve proper consists of a disk 13 provided with beveled edges 14, one surrounding each face. The Y-shaped fitting 1 has a single mouth 15 on one side of the valve, but on the other side it has two mouths 16 and 17 to afford entrances for the two lines of pipe which branch off from a single pipe and so make the reason for the Y-shaped fitting. These mouths 16 and 17 are provided with flanges 18 and 19, respectively, which, at the point where the two mouths approach each other most nearly, merge together as shown at 20 in Figures 1 and 2. The pair of branching pipe lines which run to the Y joint do not themselves enter the fitting, but short pipes or mouth pieces 21 and 22 are used at the mouths 16 and 17 respectively. These short pipes or mouth pieces are provided with flanges 23 and 24, respectively, to contact with the flanges 18 and 19 respectively. Between the flanges 23 and 18 is a gasket 25, and between the flanges 24 and 19 is a gasket 26. The other ends of the short pipes 21 and 22 are provided with flanges, as shown at 27 and 28, which will be used for joining the longer or branching pipes to the valve structure. The upper end of the Y fitting has a similar flange 29, which serves for the common pipe from the junction.

For more ease in operating the pulley 2, it is provided with a counterweight 30 to balance the weight of the valve 13.

The inner end of each of the short pipes 21 and 22 is provided with a valve seat 31 and 32, respectively. The valve 13 is made with a socket 34 in the circumferential surface thereof opposite the squared part of the shaft 11. In the position of the valve illustrated, the socket 34 is opposite an opening 35 in the wall of the fitting 1. In the other closed position of the valve the socket 34 will come opposite an opening 36 in the other wall of the fitting 1. Each of these openings may be closed by screwing into it a plug. Such a plug is shown at 37 for the opening 35 in Figure 3, and at 38 for the opening 36 in each of the figures. In Figure 2, instead of the plug 37, the opening is shown as closed by a stud 40 which screws into the opening 35 but projects beyond this opening into the socket 34.

The stud 40 by entering the socket 34 holds the valve 13 against movement. The bolts holding the short pipe 21 in place may then be removed and the pipe 21 can be rotated to grind the valve seat 31 and the beveled edge 14 against one another, so that the valve and valve seat will come together accurately. Preferably during this grinding the gasket 25 is removed. When the grinding is finished, the gasket is replaced and the bolts again used to draw the pipe 21 home to its proper position. The stud 40 is then unscrewed and the plug 37 screwed into the opening 35 in the base of the stud. The valve is then rotated with the shaft 11 so that it occupies the other position. The plug 38 is then removed and the stud 40 screwed into the hole 36, where it again enters the socket 34 and holds the valve still in its new position. By removing the bolts holding the pipe 22 in place and the gasket 26, the pipe 22 may be rotated to grind the valve seat 32 and grind the other beveled edge 14 of the valve. When this has been done, the gaskets and bolts are replaced and the plug 40 is unscrewed from the hole 36 and the plug 38 screwed in in its place. The valve is then accurately fitted so that when moved to either of its two closed positions it will not leak. The flanges 27 and 29 may be used to support guide pieces 42 to insure that the chain 3 does not get out of the groove in the pulley 2.

It will be obvious that this way of grinding a valve to insure a good fit is applicable to any Y joint, or if a different movement of the valve is used, it is applicable to other joints. It is particularly usable in heavy piping where the task of removing the valve from its casing in order to grind it is expensive. The most of the heavy piping need not be disturbed in order to grind the valve in this arrangement, but only the short pieces of pipe 21 and 22 need to be unfastened. Where the wear upon the valve seat is rapid, as, for example, in the pneumatic conveying of coal, this advantage is a very marked one.

I am aware that numerous details of construction may be varied through a wide range without departing from the principles of this invention, and I therefore do not purpose limiting the patent granted otherwise than necessitated by the prior art.

I claim as my invention:

1. In combination, a pipe fixture having three openings, pipes at an angle to each other entering two of said openings, valve seats, one at the mouth of each of said pipes, a two faced valve pivotally mounted so that in one position one face coacts with one of said valve seats and in another position the other face coacts with the other of said valve seats, and means supplemental to said pivotal mounting for holding said valve from rotation.

2. In combination, a fixture, a pipe rotatably mounted in said fixture, a valve seat on the end of said pipe toward said fixture, a valve cooperating with said seat, and means for holding said valve from rotating during the rotation of said pipe.

3. A pipe fixture, a valve movably mounted therein, said fixture having an opening opposite one position of said valve, a removable closure for said opening, and means on the valve whereby a fastening introduced through said opening can hold said valve from movement.

4. A valve having two finished faces, a discontinuity in the surface of said valve between said faces in combination with fastening means adapted to cooperate with said discontinuity.

5. A valve having two finished faces, a fitting containing said valve, a mounting constraining the valve to a definite movement, and a two part fastening, one of said parts being formed in the surface of said valve between said faces and the other of said parts being mounted in said fitting.

6. A pair of pipes at an angle to each other, a fitting forming the junction of said pipes, the ends of said pipes in the fitting having valve seats formed thereon, a valve in the fitting, a pivot for said valve between the center lines of said pipes, said fitting having screw threaded openings, one on each side thereof, exterior to said lines, said valve having a socket which in one position of the valve is opposite one of said openings and in another position of the valve is opposite the other of said openings, the valve contacting with one or the other of said valve seats when it is in either of said positions.

In testimony whereof I have hereunto subscribed my name in the presence of two subscribing witnesses.

FRITZ HOVING.

Witnesses:
 CARLTON HILL,
 JAMES M. O'BRIEN.